(12) United States Patent
Erlich et al.

(10) Patent No.: US 10,768,411 B2
(45) Date of Patent: Sep. 8, 2020

(54) HYBRID MEMS SCANNING MODULE

(71) Applicant: APPLE INC., Cupertino, CA (US)

(72) Inventors: Raviv Erlich, Kibbutz Beit Nir (IL); Alexander Shpunt, Portola Valley, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/425,997

(22) Filed: May 30, 2019

(65) Prior Publication Data
US 2019/0317314 A1 Oct. 17, 2019

Related U.S. Application Data

(63) Continuation of application No. 15/622,084, filed on Jun. 14, 2017, now Pat. No. 10,330,921, which is a continuation of application No. 14/622,942, filed on Feb. 16, 2015, now Pat. No. 9,798,135.

(51) Int. Cl.
G02B 26/08 (2006.01)
G02B 26/10 (2006.01)

(52) U.S. Cl.
CPC ....... *G02B 26/085* (2013.01); *G02B 26/0833* (2013.01); *G02B 26/101* (2013.01); *G02B 26/105* (2013.01)

(58) Field of Classification Search
CPC ....... B81B 3/00; B81B 3/0018; B81B 3/0062; B81B 3/0064; B81B 3/0067; B81B 2201/02; B81B 2201/028; B81B 2201/0235; B81B 2201/0242; B81B 2201/025; B81B 2201/0257
See application file for complete search history.

(56) References Cited

U.S. PATENT DOCUMENTS

| 4,620,752 | A | 11/1986 | Fremerey et al. | |
| 2010/0182667 | A1* | 7/2010 | Ishida | G02B 26/101 359/200.7 |
| 2011/0205609 | A1* | 8/2011 | Mizoguchi | G02B 26/101 359/200.2 |
| 2014/0153001 | A1* | 6/2014 | Chayat | G01S 17/10 356/612 |

FOREIGN PATENT DOCUMENTS

EP 2573612 A1 3/2013

OTHER PUBLICATIONS

European Application # 15826002.6 office action dated Apr. 23, 2020.

* cited by examiner

Primary Examiner — Robert E. Tallman
(74) Attorney, Agent, or Firm — Kligler & Associates Patent Attorneys Ltd

(57) ABSTRACT

A scanning device includes a base containing one or more rotational bearings disposed along a gimbal axis. A gimbal includes a shaft that fits into the rotational bearings so that the gimbal rotates about the gimbal axis relative to the base. A mirror assembly includes a semiconductor substrate, which has been etched and coated to define a support, which is fixed to the gimbal, at least one mirror, contained within the support, and a connecting member connecting the at least one mirror to the support and defining at least one mirror axis, about which the at least one mirror rotates relative to the support.

20 Claims, 4 Drawing Sheets

HYBRID MEMS SCANNING MODULE

CROSS-REFERENCE TO RELATED APPLICATION

This application is a continuation of U.S. patent application Ser. No. 15/622,084, filed Jun. 14, 2017, which is a continuation of U.S. patent application Ser. No. 14/622,942, filed Feb. 16, 2015 (now U.S. Pat. No. 9,798,135), which is incorporated herein by reference.

FIELD OF THE INVENTION

The present invention relates generally to micro-mechanical systems, and particularly to optical scanning using such systems.

BACKGROUND

Microelectromechanical systems (MEMS) are very small machines (on the scale of a few micrometers to about ten millimeters) that are produced using modified semiconductor device fabrication technologies, such as photolithography, etching, and thin film deposition. Current MEMS devices include, inter alia, miniature scanning mirrors for use in optical projection and sensing.

For example, U.S. Pat. No. 7,952,781, whose disclosure is incorporated herein by reference, describes a method of scanning a light beam and a method of manufacturing a microelectromechanical system (MEMS), which can be incorporated in a scanning device. Other methods for fabrication of MEMS scanning devices are described in PCT International Publication WO 2014/064606, which is also incorporated herein by reference.

U.S. Patent Application Publication 2013/0207970, whose disclosure is incorporated herein by reference, describes a scanning depth engine, which includes a transmitter, which emits a beam comprising pulses of light, and a scanner, which is configured to scan the beam, within a predefined scan range, over a scene. The scanner may comprise a micromirror produced using MEMS technology. A receiver receives the light reflected from the scene and generates an output indicative of the time of flight of the pulses to and from points in the scene. A processor is coupled to control the scanner and to process the output of the receiver so as to generate a 3D map of the scene.

Another time-of-flight scanner using MEMS technology is the Lamda scanner module produced by the Fraunhofer Institute for Photonic Microsystems IPMS (Dresden, Germany). The Lamda module is constructed based on a segmented MEMS scanner device consisting of identical scanning mirror elements. A single scanning mirror of the collimated transmit beam oscillates parallel to a segmented scanning mirror device of the receiver optics.

PCT International Publication WO 2014/016794, whose disclosure is incorporated herein by reference, describes dual-axis MEMS scanning mirrors and magnetic driving arrangements for such mirrors. In the disclosed embodiments, a micromirror is mounted on a miniature gimbaled base, so that the base rotates relative to a support structure in the low-frequency (slow) scan direction, while the micromirror itself rotates relative to the base in the high-frequency (fast) scan direction. The micromirror assembly is produced by suitably etching a semiconductor substrate to separate the micromirror from the base and to separate the base from the remaining substrate, which serves as the support structure. The same magnetic drive can be used to power both the fast and slow scans.

U.S. Patent Application Publication 2014/0153001, whose disclosure is incorporated herein by reference, describes a gimbaled scanning mirror array, in which a substrate is etched to define an array of two or more parallel micromirrors and a support surrounding the micromirrors. Respective spindles connect the micromirrors to the support, thereby defining respective parallel axes of rotation of the micromirrors relative to the support. One or more flexible coupling members are connected to the micromirrors so as to synchronize an oscillation of the micromirrors about the respective axes.

SUMMARY

Embodiments of the present invention that are described hereinbelow provide improved MEMS-based scanning modules.

There is therefore provided, in accordance with an embodiment of the present invention, a scanning device, which includes a base containing one or more rotational bearings disposed along a gimbal axis. A gimbal includes a shaft that fits into the rotational bearings so that the gimbal rotates about the gimbal axis relative to the base. A mirror assembly includes a semiconductor substrate, which has been etched and coated to define a support, which is fixed to the gimbal, at least one mirror, contained within the support, and a connecting member connecting the at least one mirror to the support and defining at least one mirror axis, about which the at least one mirror rotates relative to the support.

In a disclosed embodiment, the bearings include rolling-element bearings, including an outer race that is fixed to the base and an inner race that is fixed to the shaft of the gimbal. Typically, the one or more rotational bearings include a pair of bearings disposed at opposing ends of the gimbal axis, wherein the at least one mirror axis is perpendicular to the gimbal axis.

In some embodiments, the connecting member includes hinges arranged along the at least one mirror axis. In one embodiment, the at least one mirror includes an array of two or more mirrors contained within the support, and the hinges include two or more pairs of hinges, which are connected respectively to the two or more mirrors and define respective, mutually parallel mirror axes about which the mirrors rotate. Typically, the mirrors in the array are coupled together with a coupling strength sufficient to synchronize an oscillation of the mirrors about the respective mirror axes.

In some embodiments, the device includes a drive, which is coupled to the mirror assembly and the gimbal so as to cause the at least one mirror to rotate about the at least one mirror axis at a first frequency, while causing the gimbal to rotate about the gimbal axis at a second frequency, which is lower than the first frequency. Typically, the first frequency is a resonant frequency of rotation of the at least one mirror within the support.

In a disclosed embodiment, the drive is an electromagnetic drive, which includes a stator assembly, which is fixed to the base and includes at least one core containing an air gap and one or more coils including conductive wire wound on the at least one core so as to cause the at least one core to generate a magnetic field in the air gap in response to an electrical current flowing in the conductive wire. At least one rotor includes one or more permanent magnets, which are fixed to the shaft of the gimbal and which are positioned in the air gap so as to rotate in response to the magnetic field. Drive circuitry is coupled to apply the electrical current to the one or more coils.

In one embodiment, the at least one rotor includes one or more further permanent magnets, which are fixed to the at least one mirror, and the stator assembly includes a further core positioned in proximity to the at least one mirror and wound with one or more further coils. The drive circuitry is coupled to apply the electrical current at the first frequency to the one or more further coils and at the second frequency to the one or more coils wound on the at least one core containing the air gap.

There is also provided, in accordance with an embodiment of the present invention, a method for producing a scanning device. The method includes etching and coating a semiconductor substrate so as to define at least one mirror, a support surrounding the at least one mirror, and a connecting member connecting the at least one mirror to the support and defining at least one mirror axis, about which the at least one mirror rotates relative to the support. The support is fixed to a gimbal having a shaft. The shaft is fitted into one or more rotational bearings that are held by a base on a gimbal axis, so that the gimbal rotates about the gimbal axis relative to the base.

The present invention will be more fully understood from the following detailed description of the embodiments thereof, taken together with the drawings in which:

DETAILED DESCRIPTION OF EMBODIMENTS

Figure 1:
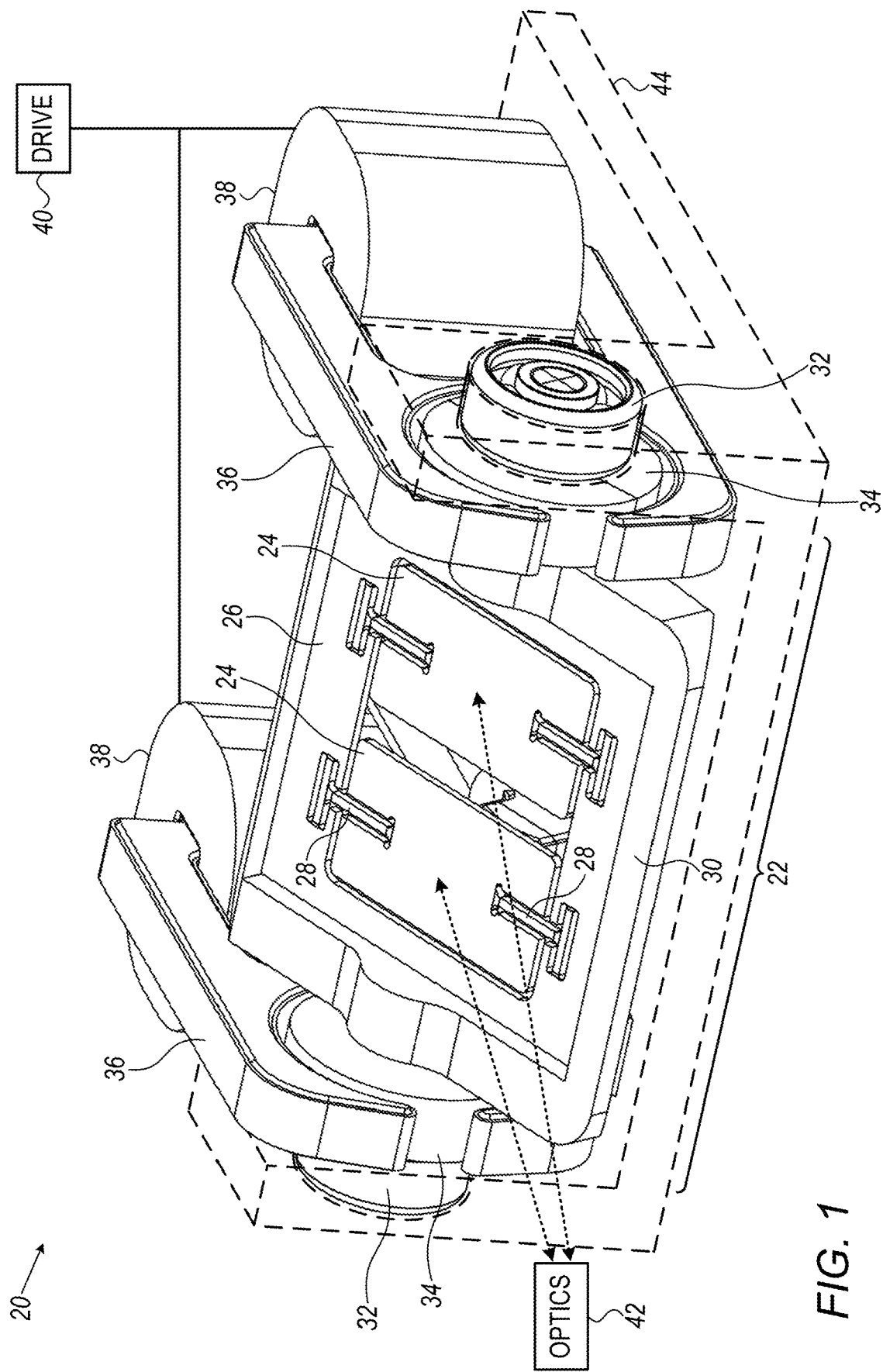
FIG. 1 is a schematic, pictorial illustration of a scanning device comprising a hybrid scanning module, in accordance with an embodiment of the present invention.

MEMS scanning modules, of the type described in the above-mentioned PCT International Publication WO 2014/016794, for example, have advantages of small size, light weight, and low energy consumption. The energy consumption is particularly low when the scan frequency is close to the resonant frequency of rotation of the scanning elements about their hinges, but can rise sharply at other frequencies. In the sorts of scanner designs and applications that are described in WO 2014/016794, resonant scanning is implemented in the "fast axis" scan of the mirror relative to the gimbal, but the "slow axis" scan of the gimbal itself is driven in a quasi-static mode, at a scan frequency far below the resonant frequency.

To reduce energy consumption, particularly in the non-resonant scan, it is desirable that the hinges be made as flexible as possible in torsion. For MEMS structures produced by etching a silicon wafer, greater flexibility is generally achieved by making the hinges thinner. Thin hinges, however, also have reduced resistance to linear displacement, which makes them more prone to breaking when subjected to mechanical shock and vibration. Thus, there is a difficult tradeoff in the design of MEMS scanners between the durability of the hinges on which the gimbal rotates and the energy needed to drive the rotation.

Embodiments of the present invention that are described herein address this difficulty using a hybrid design, which combines the advantages of MEMS hinges and mechanical bearings in a single scanning device. In the disclosed embodiments, a mirror assembly is produced by etching and coating a semiconductor substrate to define one or more mirrors, a surrounding support, and a connecting member, such as hinges connecting the mirrors to the support. The support, in turn, is fixed to a gimbal, which is typically not a MEMS device, but rather has a shaft that fits into and rotates within one or more rotational bearings in a base of the scanning device. Each mirror thus rotates, relative to the support and gimbal, about a mirror axis defined by the etched hinges, while the support and gimbal rotate relative to the base about a gimbal axis defined by the bearings. The mirror axis (or axes) and gimbal axis are typically (but not necessarily) mutually perpendicular, in order to give full, dual-axis scanning.

In this sort of hybrid device, the MEMS assembly can be designed so that the mirror or mirrors have low inertia and oscillate about the hinges at substantially any desired frequency, including resonant oscillation with a high quality factor, thus resulting in low power consumption. The gimbal, on the other hand, can be molded or machined with a stiff shaft, which is resistant to mechanical stresses, while requiring only minimal energy input to drive its rotation in the low-friction mechanical bearings. The hybrid device thus offers greater robustness and versatility, as well as lower energy consumption, than could be achieved by either all-MEMS or all-mechanical designs.

Figure 2:
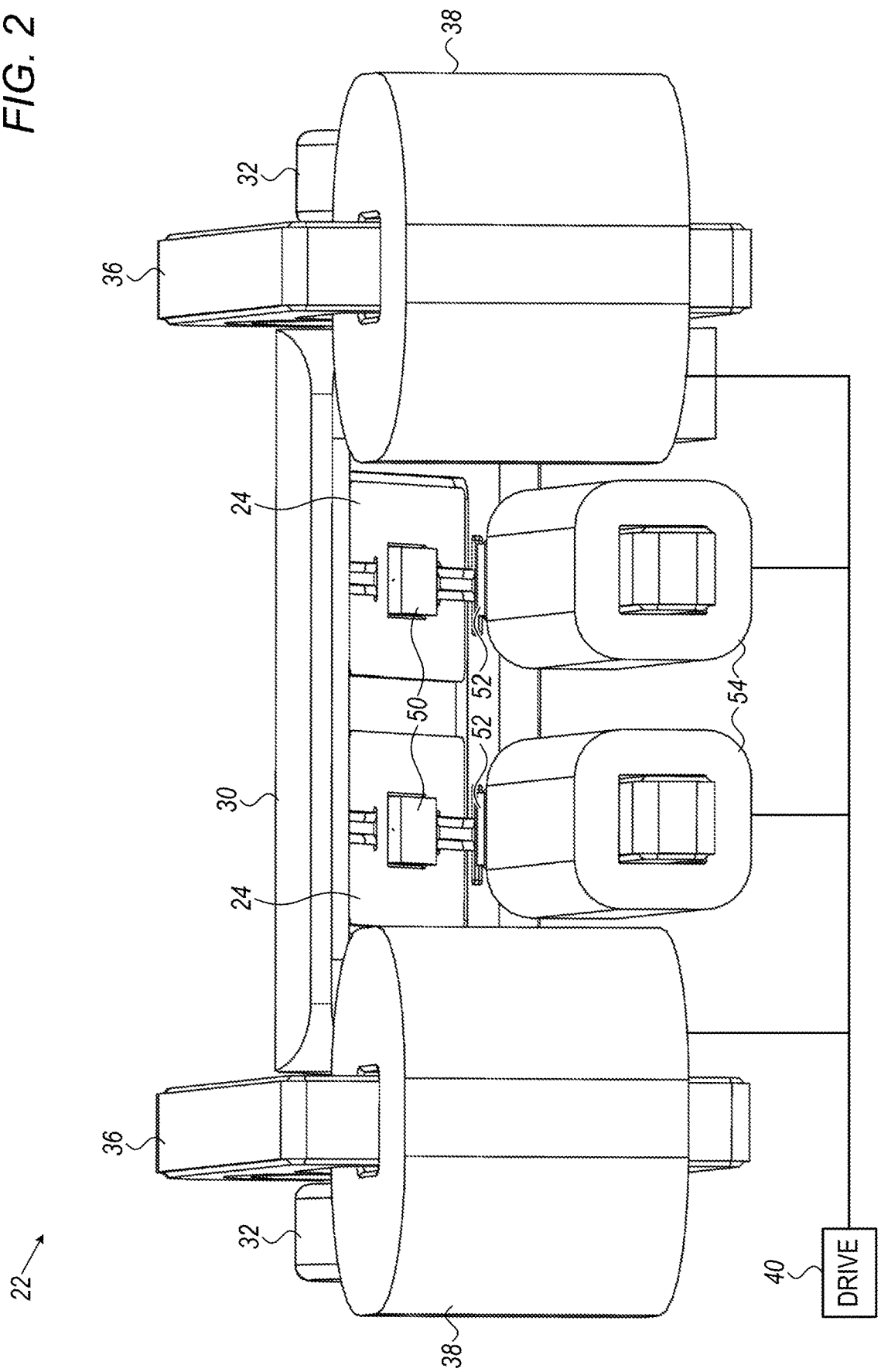
FIG. 2 is a schematic rear view of the scanning module of FIG. 1.
Figure 3:
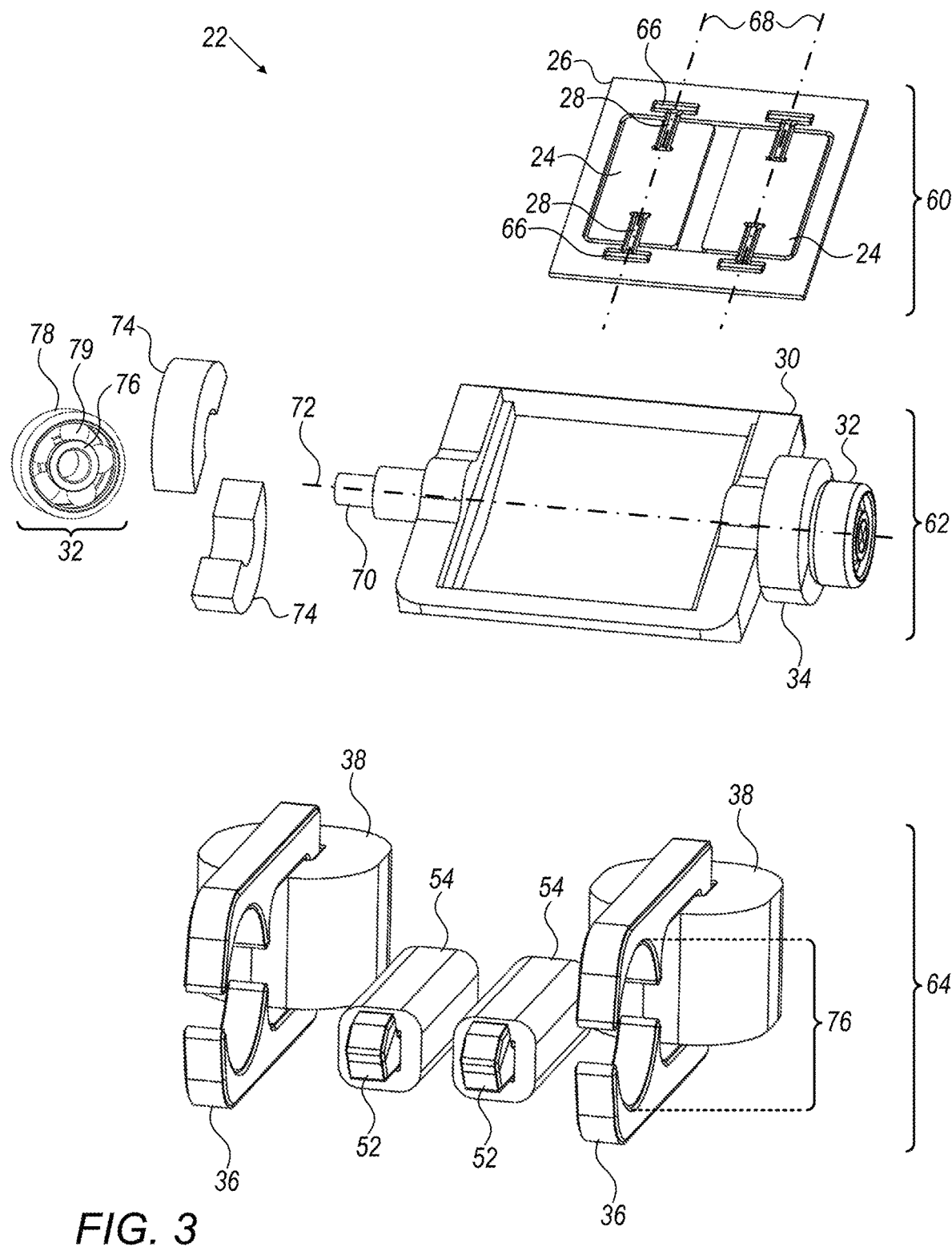
FIG. 3 is a schematic exploded view of the scanning module of FIG. 1.
Figure 4:
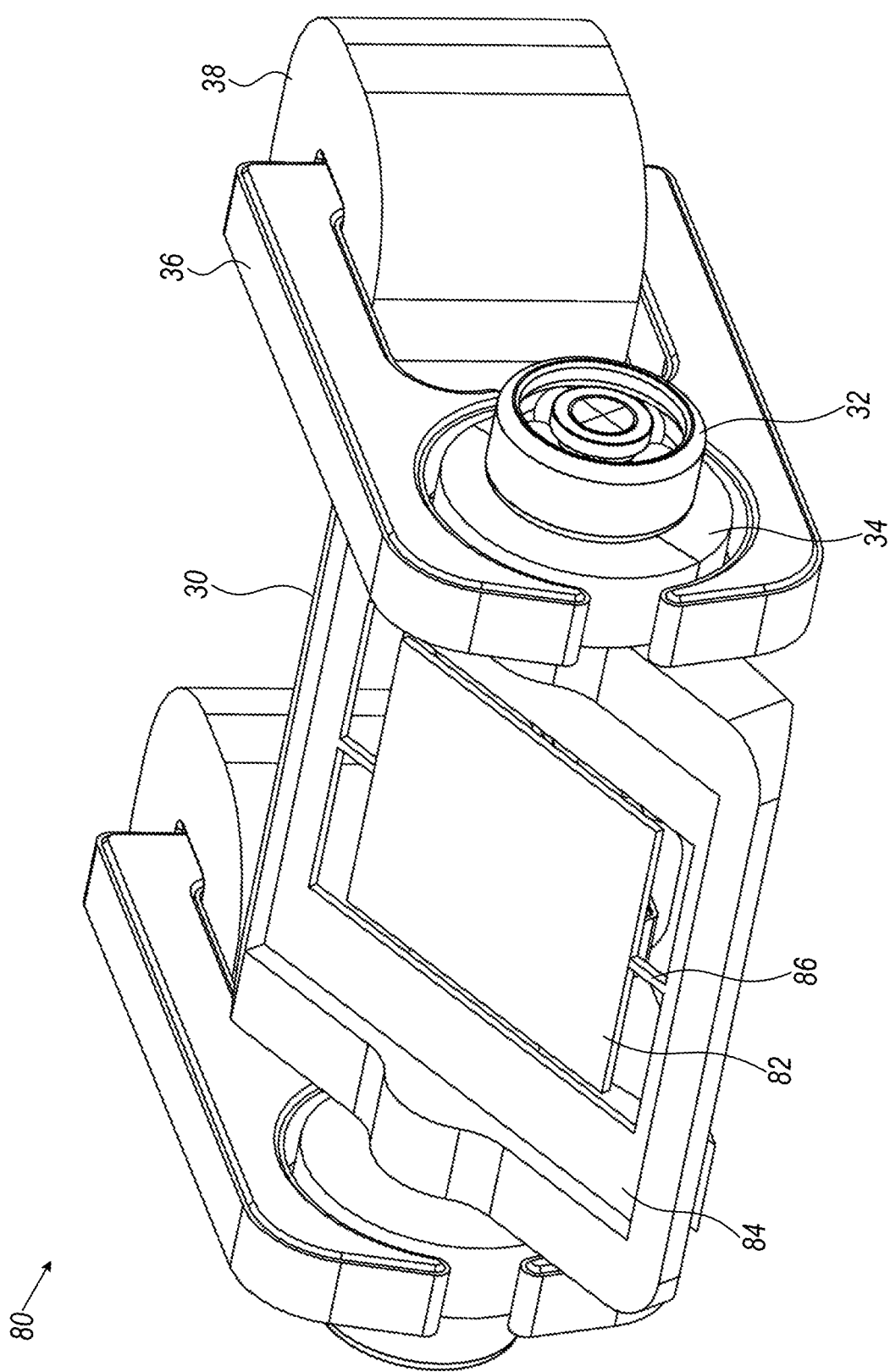
FIG. 4 is a schematic, pictorial illustration of a hybrid scanning module, in accordance with another embodiment of the present invention.

Reference is now made to FIGS. 1-3, which schematically illustrate a scanning device 20, in accordance with an embodiment of the present invention. FIG. 1 is a pictorial illustration of the device, while FIG. 2 provides a rear view and FIG. 3 is an exploded view. Device 20 comprises a scanning module 22 that includes an array of two mirrors 24, which oscillate about their respective axes in mutual synchronization, as described below. Alternatively, however, the principles embodied in device 20 may be applied in scanning devices comprising only a single mirror (as illustrated in FIG. 4 and described below), as well as in scanning devices containing arrays of three or more mirrors.

As can be seen most clearly in FIG. 3, scanning module 22 comprises a mirror assembly 60, produced using MEMS techniques, which is mounted in a mechanical gimbal assembly 62. Gimbal assembly 62 comprises a gimbal 30, having a shaft 70 that fits into a pair of rotational bearings 32 at opposing ends of the shaft, thus defining a gimbal axis 72. In an alternative embodiment (not shown in the figures), the shaft of the gimbal may be held in a single bearing or in a pair of bearings that are both on the same side of the gimbal, rather than on opposite sides as shown in the figures. Bearings 32 are contained in and held by a base 44, which may be of any suitable type and form (and is drawn in dashed lines for clarity of illustration). A stator assembly 64, fixed to base 44, drives the rotation of gimbal 30 and mirrors 24 about their respective axes.

Mirrors 24 in assembly 60 are produced using MEMS techniques, such as the techniques described in the references cited above in the Background section, for example. A semiconductor wafer (typically single-crystal silicon) is etched to separate mirrors 24 from a surrounding support 26, and likewise to produce pairs of hinges 28, which connect the mirrors to the support along the mirror axes. Hinges 28 thus define mirror axes 68, which are typically parallel to one another and perpendicular (or at least non-parallel) to gimbal axis 72. A reflective coating, typically metallic, is formed on the surfaces of mirrors 24, using thin-film deposition techniques that are known in the art. Hinges 28 are one example of the sort of connecting member that may connect the mirror or mirrors to the support and enable the mirrors to rotate; but in alternative embodiments (not shown in the figures), other sorts of connecting members may be etched from the wafer, such as cantilevered or tilting structures, as are known in the art.

Typically, mirrors 24 have a reflective area that can be anywhere in the range of 5-250 mm$^2$, depending on application requirements, while assembly 60 has a wafer thickness that is less than 1 mm. Given these parameters, mirrors 24 can be made to rotate about axes 68 over large angles (typically ±10-25°) at high frequencies (typically 2-25 kHz). Assembly 60 may be sealed within a transparent cover (not shown in the figures), which may even be evacuated to reduce air resistance and eliminate acoustic noise as mirrors 24 rotate. In some embodiments, assembly 60 is designed so that mirrors 24 rotate resonantly about axes 68 at the desired scan frequency. The resonant frequency is determined by the inertia, material properties (elasticity and stiffness), and hinge geometry of the assembly.

In the pictured embodiment, the individual rotations of mirrors 24 are coupled together so that the oscillations of the mirrors about the respective axes are synchronized. For this purpose, the ends of hinges 28 are connected to transverse beams 66, which are likewise etched from the wafer and deform as hinges 28. The structure of flexible, elastic support 26, including beams 66, is chosen so that the support itself couples together the motion of mirrors 24 with a coupling strength sufficient to synchronize their oscillations about their respective axes of rotation. For this purpose, the components of assembly 60 are designed and etched so as to define a resonant mode of overall oscillation of the assembly, including support 26 and mirrors 24 together, having a quality factor sufficiently high so that the mirrors rotate in synchronization at the resonant frequency. Support 26 is mounted in gimbal 30 along its edges so that this resonant mode of oscillation is only minimally damped by the rigid gimbal.

Alternatively, the necessary coupling between mirrors 24 may be provided by flexible coupling members, for example, as described in the above-mentioned U.S. Patent Application Publication 2014/0153001, or by electrical or magnetic coupling between the mirrors.

In contrast to mirror assembly 60, gimbal 30 is typically produced from a plastic, metal or composite material, by a molding or machining process for example. In the pictured embodiment, bearings 32 at the ends of shaft 70 are rolling-element bearings, such as ball bearings. Inner races 75 of bearings 32 are thus fixed to shaft 70, while outer races 78 are fixed to base 44, with balls 79 rolling between the races, as is known in the art. Alternatively, any other suitable sort of low-friction bearings may be used in device 20. One example of bearings suitable for mirror motion are flexure pivot bearings, which have the required range of motion, with a restoring spring to stabilize the system dynamics. In other configurations, sliding bearings may be used.

The rotations of mirrors 24 and gimbal 30 are driven by an electromagnetic drive, comprising stator assembly 64 and rotors 34 and 50, which are fixed respectively to shaft 70 of the gimbal and to the back side of mirror 24 (as seen in FIG. 2), along with drive circuitry 40 connected to the stator assembly. The principles of this sort of electromagnetic drive are described in detail in the above-mentioned PCT International Publication WO 2014/016794. These principles are applied in device 20 to drive mirrors 24 to rotate about axes 68 at one frequency—typically a high (and possibly resonant) frequency—while causing gimbal 30 to rotate about axis 72 at a lower frequency.

In optical applications, the frequencies and amplitudes of rotation of mirrors 24 and gimbal 30 are typically chosen so as to define a raster scan over an angular range of interest. Optics 42 (such as the optical and optoelectronic components described in WO 2014/016794) direct a beam of radiation toward mirrors 24, which scan the beam over a scene or area of interest, and/or receive radiation reflected from the scene or area via the mirrors. Both of mirrors 24 may be used for both transmission and reception, assuming optics 42 comprise a suitable beam-combiner (not shown), or alternatively, one mirror may be used for transmission and the other for reception. Further alternatively, depending on the application in which device 20 is used, optics 42 may only transmit radiation or only receive radiation via scanning module 22. Depending on the application, the scanning module may comprise smaller or larger numbers of mirrors, of any suitable shape and geometric arrangement. All such alternative implementations and applications are considered to be within the scope of the present invention.

To drive the rotation of gimbal 30, stator assembly 64 comprises a pair of cores 36, comprising a suitable magnetic material, which are fixed to base 44. Coils 38 of conductive wire are wound on cores 36. Cores 36 contain an air gap 76, in which rotors 34 are positioned. Rotors 34 comprise permanent magnets 74, which are fixed at both ends of shaft 70. (Alternatively, the rotation of gimbal 30 in bearings 32 could be driven by a single core and a single magnetic rotor at one end of shaft 70.)

Drive circuitry 40 applies a time-varying electrical current to coils 38, which causes cores 36 to generate a time-varying magnetic field in air gaps 76. Typically, drive circuitry 40 comprises a frequency generator, which generates electrical signals at the desired frequency or frequencies, along with suitable amplifiers to provide the desired current levels to the coils. The magnetic field generated in air gaps 76 interacts with the magnetization of rotors 34 and thus causes the rotors to rotate back and forth within air gaps 76 at a rotational frequency determined by the alternation frequency of the current applied by circuitry 40.

Stator assembly 64 comprises an additional pair of cores 52, positioned with their front ends in proximity to rotors 50 on the back sides of mirrors 24. Rotors 50 typically comprise permanent magnets, which may be recessed into mirrors 24 so that the centers of mass of the mirrors are located along, or at least closer to, axes 68. Cores 52 are wound with coils 54 of conductive wire, which are also driven with a time-varying current by drive circuitry 40. In this case, the drive current alternates at the desired (higher) frequency of rotation of mirrors 24 about axes 68. The resulting time-varying magnetic field emanating from the front ends of cores 52 causes rotors 50, and hence mirrors 24, to oscillate back and forth about hinges 28. Alternatively, a single wire-wound core may be used to drive the rotations of both mirrors.

The shapes and geometries of cores 36 and 52 and of the corresponding coils 38 and 54 and rotors 34 and 50 are shown by way of example. Other suitable arrangements and configurations, using smaller or greater numbers of cores, coils and rotors, of different shapes and/or different locations, will be apparent to those skilled in the art after reading the present disclosure and the references cited herein, and are considered to be within the scope of the present invention.

Furthermore, the rotations of mirror assembly 60 and gimbal assembly 62 about the respective axes may be driven at the desired frequencies by other means than the particular magnetic drive configurations that are shown in the figures. For example, the drive currents that are applied to coils 38 may include a differential high-frequency component so that the magnetic fields emanating from cores 36 drive the rotations of rotors 50, as well, at the high frequency. As another example, mirrors 24 may be weighted asymmetrically about axes 68 so as to mechanically couple the rotation of the mirrors about these axes to the rotation of gimbal 30 about axis 72. Consequently, as gimbal 30 is driven to rotate, some of the rotational energy will be coupled into resonant rotation of mirrors 24 about their axes. Alternative drive modes of these sorts are described in the above-mentioned PCT International Publication WO 2014/016794.

As yet another example, other types of drives, such as an electrostatic drive, may be used in device 20, particularly for driving the rotations of mirrors 24. For example, the actuators described by Hah et al., in "Theory and Experiments of Angular Vertical Comb-Drive Actuators for Scanning Micromirrors," *IEEE Journal of Selected Topics in Quantum Electronics* 10:3 (May/June, 2004), pages 505-513, may be modified to drive mirrors 24 in device 20. Alternatively, the drive may be based on voice coil actuation, piezoelectric actuation, or any other suitable method that is known in the art.

FIG. 4 is a schematic, pictorial illustration of a hybrid scanning module 80, in accordance with another embodiment of the present invention. Module 80 is similar in construction and operation to module 22, except that module 80 comprises only a single scanning mirror 82. Mirror 82 is attached to a support 84 by hinges 86, produced from a semiconductor wafer using the sort of MEMS processing that is described above. Support 84 is fixed to gimbal 30, which is substantially identical to the gimbal shown in the preceding figures, as are the corresponding drive components. The rotation of mirror 82 about hinges 86 may be driven by a magnetic drive (similar to that shown in FIG. 2), or by any of the other means that are noted above.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A scanning device, comprising:
a base containing one or more rotational bearings disposed along a gimbal axis;
a gimbal, comprising a shaft that fits into the rotational bearings so that the gimbal rotates about the gimbal axis relative to the base;
a mirror assembly, comprising a semiconductor substrate, which has been etched and coated to define:
a support, which is fixed to the gimbal;
at least one mirror, contained within the support; and
a connecting member connecting the at least one mirror to the support and defining at least one mirror axis, about which the at least one mirror rotates relative to the support; and
a drive, comprising:
a mirror drive assembly, which comprises at least one rotor comprising one or more permanent magnets, which are fixed to the at least one mirror, and a stator comprising at least one core, which is positioned in proximity to the at least one mirror and wound with one or more coils;
a gimbal drive assembly, which is configured to rotate the gimbal about the gimbal axis; and
drive circuitry, which is coupled to apply electrical currents to the gimbal drive assembly and to the one or more coils of the mirror drive assembly so as to cause the gimbal and the at least one mirror to rotate about the gimbal axis and the at least one mirror axis, respectively.

2. The device according to claim 1, wherein the bearings comprise rolling-element bearings, comprising an outer race that is fixed to the base and an inner race that is fixed to the shaft of the gimbal.

3. The device according to claim 1, wherein the one or more rotational bearings comprise a pair of bearings disposed at opposing ends of the gimbal axis.

4. The device according to claim 1, wherein the at least one mirror axis is perpendicular to the gimbal axis.

5. The device according to claim 1, wherein the connecting member comprises hinges arranged along the at least one mirror axis.

6. The device according to claim 5, wherein the at least one mirror comprises an array of two or more mirrors contained within the support, and wherein the hinges comprise two or more pairs of hinges, which are connected respectively to the two or more mirrors and define respective, mutually parallel mirror axes about which the mirrors rotate.

7. The device according to claim 6, wherein the mirrors in the array are coupled together with a coupling strength sufficient to synchronize an oscillation of the mirrors about the respective mirror axes.

8. The device according to claim 1, wherein the drive is configured to cause the at least one mirror to rotate about the at least one mirror axis at a first frequency, while causing the gimbal to rotate about the gimbal axis at a second frequency, which is lower than the first frequency.

9. The device according to claim 8, wherein the first frequency is a resonant frequency of rotation of the at least one mirror within the support.

10. The device according to claim 8, wherein the gimbal drive assembly comprises:
a stator assembly, which is fixed to the base and comprises at least one further core and one or more further coils comprising conductive wire wound on the at least one further core; and
at least one further rotor, comprising one or more further permanent magnets, which are fixed to the shaft of the gimbal.

11. The device according to claim 10, wherein the drive circuitry is coupled to apply the electrical currents at the second frequency to the one or more further coils and at the first frequency to the one or more coils wound on the stator of the mirror drive assembly.

12. The device according to claim 1, wherein the one or more permanent magnets are fixed to a back side of the at least one mirror, and wherein the at least one core has a front end positioned in proximity to the back side of the at least one mirror.

13. The device according to claim 12, wherein at least one core is fixed to the base.

14. The device according to claim 12, wherein the one or more permanent magnets are recessed into the back side of the at least one mirror.

15. A method for producing a scanning device, the method comprising:
- etching and coating a semiconductor substrate so as to define:
  - at least one mirror;
  - a support surrounding the at least one mirror; and
  - a connecting member connecting the at least one mirror to the support and defining at least one mirror axis, about which the at least one mirror rotates relative to the support;
- fixing the support to a gimbal having a shaft;
- fitting the shaft into one or more rotational bearings that are held by a base on a gimbal axis, so that the gimbal rotates about the gimbal axis relative to the base;
- fixing at least one rotor, comprising one or more permanent magnets, to the at least one mirror;
- positioning a stator, comprising at least one core wound with one or more coils, in proximity to the at least one mirror;
- coupling a gimbal drive assembly to rotate the gimbal about the gimbal axis; and
- applying electrical currents to the gimbal drive assembly and to the one or more coils of the stator so as to cause the gimbal and the at least one mirror to rotate about the gimbal axis and the at least one mirror axis, respectively.

16. The method according to claim 15, wherein fitting the shaft comprises inserting the shaft into a pair of bearings disposed at opposing ends of the gimbal axis.

17. The method according to claim 15, wherein the at least one mirror axis is perpendicular to the gimbal axis.

18. The method according to claim 15, wherein applying the electrical currents causes the at least one mirror to rotate about the at least one mirror axis at a first frequency, while causing the gimbal to rotate about the gimbal axis at a second frequency, which is lower than the first frequency.

19. The method according to claim 18, wherein the first frequency is a resonant frequency of rotation of the at least one mirror within the support.

20. The method according to claim 18, wherein fixing the at least one rotor comprises fixing the one or more permanent magnets to a back side of the at least one mirror, and wherein positioning the stator comprises positioning a front end of the at least one core in proximity to the back side of the at least one mirror.

* * * * *